United States Patent
Dumesnil et al.

[15] 3,650,778
[45] Mar. 21, 1972

[54] LOW-EXPANSION, LOW-MELTING ZINC PHOSPHOVANADATE GLASS COMPOSITIONS

[72] Inventors: Maurice E. Dumesnil, Palo Alto; Robert R. Hewitt, San Jose; Joseph L. Bozarth, Mountain View, all of Calif.

[73] Assignee: Fairchild Camera and Instrument Corporation, Syosset, Long Island, N.Y.

[22] Filed: Oct. 29, 1969

[21] Appl. No.: 870,620

[52] U.S. Cl. .............................. 106/47 R, 106/46, 117/125
[51] Int. Cl. ........................................................... C03c 3/00
[58] Field of Search ................ 106/47, 48, 46; 161/196, 192; 252/519; 65/43; 117/125

[56] References Cited

UNITED STATES PATENTS 3,446,695  5/1969  Janakirama-Rao ...................... 106/47
3,520,831  7/1970  Trap et al. .............................. 106/47 X
3,393,060  7/1968  Blair et al. .............................. 106/47
3,534,209  10/1970  Anderson et al. ........................ 106/47

OTHER PUBLICATIONS

Grossman et al., J. AM Cer. Soc. Vol. 47, (Sept., 1964) "Zinc Borophosphate Glass" page 471

Primary Examiner—Daniel E. Wyman
Assistant Examiner—W. R. Satterfield
Attorney—Roger S. Borovoy and Alan H. Macpherson

[57] ABSTRACT

Low-melting, low-expansion, lead-free glass compositions are provided for sealing ceramics parts and encapsulating ceramic substrates. In addition to having a thermal expansion matching that of alumina, the glass compositions provide for the formation of a glass-to-alumina seal in the 380° to 450° C. temperature range.

1 Claims, 3 Drawing Figures

Patented March 21, 1972  3,650,778

INVENTORS
MAURICE E. DUMESNIL
ROBERT R. HEWITT
JOSEPH L. BOZARTH

BY *Roger S. Borovoy*
ATTORNEY

LOW-EXPANSION, LOW-MELTING ZINC PHOSPHOVANADATE GLASS COMPOSITIONS

BACKGROUND OF THE INVENTION

1. Field of the Invention

This invention relates to low-melting, low-expansion glass compositions, and articles including such compositions as part of their structure. In particular, this invention relates to glass compositions that match the thermal expansion of alumina ceramics, and provide for the formation of glass-to-alumina seals in temperatures in the 380° to 450° C. range.

2. Description of the Prior Art

Effort has been made in the past, without success, toward providing the semiconductor industry with a chemically inert, electrically insulating glass material possessing a softening point in the 400° C. range and a thermal expansion matching alumina ceramics (57 to $62\times10^{-7}$ per degree centigrade).

Until now, low-melting glasses, known generically as solder glasses, have contained large amounts of lead oxide to reduce their softening points to low workable temperatures. However, increasing the lead content in these glasses correspondingly increases their thermal expansion coefficient to a value 30 to 80 percent higher than that of alumina. Therefore, to produce hermetic and mechanically sound seals on alumina with these high lead content glasses, it has been necessary to add to the glass, while in powder form, a low-expansion ceramic powder (such as β-eucryptite, zirconia, zirconium silicate) and to modify the internal structure of the glass by induced recrystallization. The presence of a multitude of small crystals within the glass layer prevents the propagation of surface cracks through the glassy/polycrystalline seal subjected to considerable tensile stresses. A major drawback to this method is the necessity of increasing the sealing temperature by about 100° C. above the glass softening point. Accordingly, this type of seal is in general made at 530° C. For many semiconductor devices, particularly metal-oxide-silicon (MOS) and linear devices, sealing temperatures in the 530° C. range are too high because of the surface sensitivity of such devices and the likelihood that unwanted impurities, such as sodium ions, will diffuse through the overlying thermal oxide to the silicon surface and detrimentally affect the device electrical characteristics.

Furthermore, serious difficulties have been encountered because of the high water solubility of recrystallized lead glasses at temperatures above 60° C. Also, lead glasses are sensitive to chemical and plating solutions, particularly solutions containing acids having a pH value less than 5, or bases having a pH value greater than 9.

Another drawback with lead glass seals is related to the high neutron cross section of lead ions which causes destruction of the seal when exposed to high density radiation.

The drawback of lead glasses, namely, their high linear thermal expansion, hot water solubility, chemical sensitivity to acidic and basic solutions, ease of chemical reduction during sealing and high radiation absorbency make glass compositions containing lead oxide unsuitable for many semiconductor applications.

SUMMARY OF THE INVENTION

The low-expansion, low-melting glass compositions of the invention overcome the above shortcomings of the prior art as they enable a glass-to-alumina seal to be made at approximately 400° C. and have a linear thermal expansion matching alumina. Moreover, the glass compositions provide hermetic sealing for surface sensitive semiconductor devices in alumina packages of large, as well as small, size.

Briefly, the invention comprises a plurality of glass compositions having four to seven types of chemical components therein, according to weight percentage. The chemical components are selected from a group comprising zinc oxide, vanadium pentoxide, boron trioxide, phosphorus pentoxide, niobium pentoxide, tantalum pentoxide, zinc fluoride, molybdenum trioxide, bismuth trioxide, and copper oxide.

DESCRIPTION OF THE PREFERRED EMBODIMENTS

The new glass compositions according to the invention are selected from the lists of chemical components listed in Tables 1 through 5. These tables also indicate the percentage by weight of each of the chemicals of a particular composition. For example, referring to line 5 of Table 1, a glass composition comprises by weight percentage zinc oxide 55 percent, vanadium pentoxide 15 percent, boron trioxide 10 percent, and phosphorus pentoxide 20 percent. Such a composition has a softening point of 465° C. and a coefficient of thermal expansion equal to that of alumina.

In order to decrease the water solubility characteristic of the composition, it is preferred that the weight percentage of vanadium pentoxide be not greater than 20 percent. Moreover, a low vanadium pentoxide content helps reduce the electrical leakage of the glass.

A process of making one of the glass compositions according to the invention comprises selecting the chemicals according to Tables 1 through 5. The chemicals are weighed and mixed, and the mixture is then transferred to a covered crucible, normally of platinum or quartz. Next, heat is applied to the mixture, such as by placing the crucible in a furnace of approximately 1,000° C. for about 10 minutes, or until the mixture melts and forms a clear liquid. The crucible containing the liquid is removed from the furnace and after cooling to around 500° to 800° C., the liquid is poured through a system of rollers, which press the composition into glass sheets. This glass may be delineated into preforms having a desired size and shape, suitably by well-known photoresist and etching processes. A particularly convenient etchant, for example, comprises a strong solution of hydrofluoric acid, such as one having a pH content of 2 or less.

Figure 1:
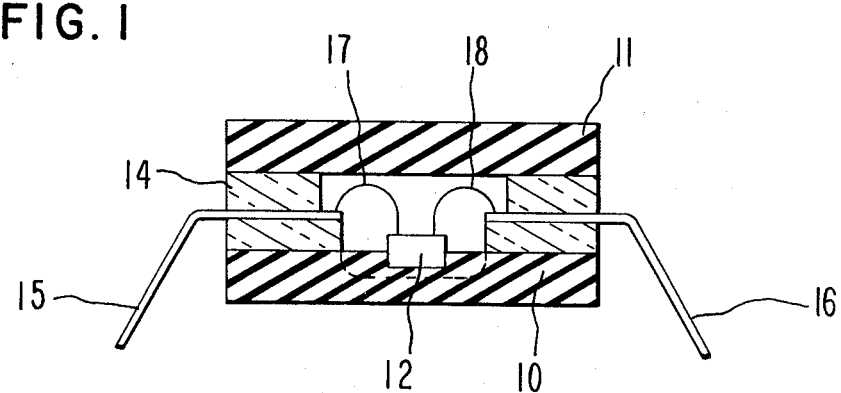
FIG. 1 is a simplified cross-sectional view of an application of the glass compositions wherein alumina ceramic parts are sealed together.

Next, the glass preform is placed directly onto a ceramic substrate and heat is applied. Suitably, the temperature of the applied heat is around 425° to 430° C., which is slightly above the softening point of 400° C. The glass preform then softens, and upon removal of the heat forms a seal with the underlying substrate. Moreover, any interconnection leads on a device located on the ceramic substrate become embedded into the glass. For example, referring to FIG. 1, a pair of alumina ceramic parts 10 and 11 are placed above and below a semiconductor device 12, the latter bonded to one of the ceramic parts. A glass sealing material 14, selected from one of the compositions listed in Tables 1 through 5, is located between ceramic parts 10 and 11 and functions to bind and seal these parts together. Interconnection to the semiconductor wafer 12 is provided by terminal leads 15 and 16 and wires 17 and 18. Portions of leads 15 and 16 are embedded in the glass material 14. Terminal leads 15 and 16 comprise material compatible with the glass material 14, such as Kovar or Alloy 42.

Figure 2:
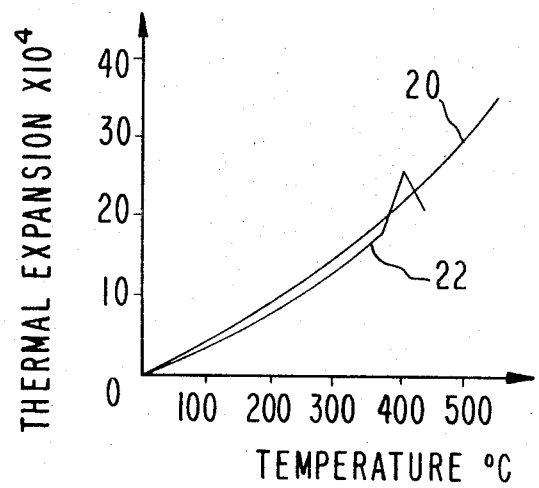
FIG. 2 is a simplified graph illustrating the similarity between the linear thermal expansion of alumina and that of one of the glass compositions of the invention.

The glass compositions of the invention as set out in Tables 1 through 5 provide a suitable encapsulating material for semiconductor devices and passive components. The close similarity between the thermal expansion of alumina and that of the glass compositions may be better appreciated by reference to FIG. 2. Curve 20 shows the typical thermal expansion of alumina for temperatures from about 25° to above 500° C. Curve 22 indicates a typical thermal expansion of one of the glass compositions selected from Tables 1 through 5. It can be seen that the thermal expansion of the glass closely approximates that of alumina.

Figure 3:
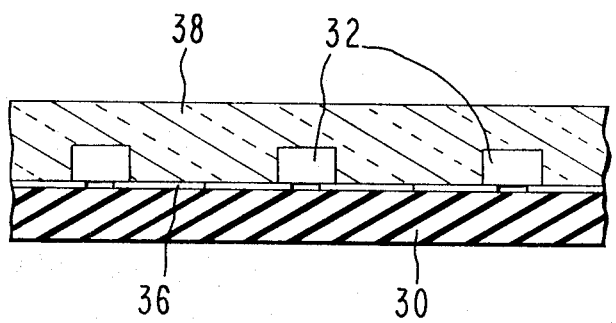
FIG. 3 is a simplified cross-sectional view of another application of the glass compositions wherein at least one surface of an alumina ceramic substrate and semiconductor devices located thereon are encapsulated.

Because the glasses can be easily drawn into sheets as described above, it is practical to place semiconductor and passive components upon a board of alumina, and cover the board and components with the glass sheet. For example, referring to FIG. 3, located upon the surface of a ceramic substrate 30 are a plurality of semiconductor devices 32. An interconnection network 36, suitably of conductive metal or semiconductor material, provides interconnections between the semiconductor devices 32, and for external connection. Encapsulation of the semiconductor devices 32, the interconnection network 36, and the ceramic surface is provided by a glass layer 38. Furthermore, since the glass compositions of the invention possess remarkable moisture resistance, no special surface coating is required.

In addition, the glass compositions of the invention may be used to seal large ceramic substrates supporting multilevel metal interconnection systems for multichip assembly.

Another application for the new glasses in thin layers is the bonding of semiconductor wafers in the construction of air isolated semiconductor devices. These glasses while still in the powder form can be used as binder for printed, pressed or molded passive components such as resistors, thermistors, capacitors, inductors or conductor lines requiring a low-melting, low-expansion glass matrix.

Because the glass compositions of the invention do not contain lead oxide, the glass is essentially unaffected by high density radiation. The problem of sodium contamination inherent with high lead glass powders is eliminated by the use of glass preforms prepared under sodium-free conditions. Moreover, the water solubility of most of the glasses described herein is extremely low and far superior to recrystallized lead glasses. Finally, because the thermal expansion is equal to or slightly less than alumina, any geometry whether large or small can be sealed at a temperature around 400° C., and therefore the multicomponent glasses described herein are much more desirable than the former lead glasses for hermetically sealing and packaging semiconductor devices.

While the invention has been described with reference to particular compositions, the invention is not limited only to compositions described. It is understood that other chemical elements, substances, materials or combinations can be added up to approximately ten percent of the total weight percentage of a particular glass composition without departing from the scope of the invention. Typical examples of other such additives comprise alumina, silicon dioxide, germanium dioxide, barium oxide, calcium oxide, strontium oxide, and so forth. It

TABLE 1

| Weight percentage | | | | Softening point °C. | Thermal coefficient of expansion compared to that of alumina |
|---|---|---|---|---|---|
| ZnO | $V_2O_5$ | $B_2O_3$ | $P_2O_5$ | | |
| 10 | 60 | 10 | 20 | 370 | Greater than. |
| 30 | 50 | 10 | 10 | 375 | Equal to. |
| 20 | 50 | 10 | 20 | 360 | Do. |
| 60 | 17.5 | 7.5 | 15 | 465 | Do. |
| 55 | 15 | 10 | 20 | 465 | Do. |
| 45 | 25 | 10 | 20 | 445 | Do. |
| 50 | 15 | 10 | 25 | 480 | Do. |
| 48 | 13 | 13 | 20 | 485 | Less than. |

TABLE 2

| Weight percentage | | | | | | Softening point °C. | Thermal coefficient of expansion compared to that of alumina |
|---|---|---|---|---|---|---|---|
| ZnO | $V_2O_5$ | $B_2O_3$ | $Nb_2O_5$ | $P_2O_5$ | $Ta_2O_5$ | | |
| 25 | 50 | 10 | 15 | | | 390 | Less than. |
| 25 | 40 | 10 | 15 | 10 | | 400 | Do. |
| 15 | 50 | 10 | 25 | | | 385 | Do. |
| 25 | 40 | | 15 | 20 | 10 | 435 | Do. |

TABLE 3

| Weight percentage | | | | | Softening point °C. | Thermal coefficient of expansion compared to that of alumina |
|---|---|---|---|---|---|---|
| ZnO | $ZnF_2$ | $V_2O_5$ | $B_2O_3$ | $Bi_2O_3$ | | |
| 50 | | 20 | 10 | 20 | 475 | Less than. |
| 40 | | 20 | 10 | 30 | 465 | Equal to. |
| 20 | 20 | 20 | 10 | 30 | 435 | Greater than. |
| | 40 | 20 | 10 | 30 | 425 | Do. |
| 20 | 25 | 25 | 10 | 20 | 450 | Equal to. |
| 25 | 25 | 20 | 10 | 20 | 450 | Less than. |
| 15 | 20 | 20 | 10 | 35 | 400 | Equal to. |
| 10 | 20 | 20 | 10 | 40 | 460 | Do. |
| 15 | 20 | 20 | 15 | 30 | 470 | Do. |
| 20 | 20 | 20 | 15 | 25 | 460 | Do. |
| 10 | 30 | 20 | 10 | 30 | 425 | Greater than. |

TABLE 4

| Weight percentage | | | | | | Softening point °C. | Thermal coefficient of expansion compared to that of alumina |
|---|---|---|---|---|---|---|---|
| ZnO | $ZnF_2$ | $V_2O_5$ | $B_2O_3$ | $Bi_2O_3$ | $MoO_3$ | | |
| 20 | 20 | 20 | 10 | 20 | 10 | 425 | Equal to. |
| 15 | 20 | 20 | 10 | 20 | 15 | 410 | Greather than. |
| 20 | 20 | 20 | 10 | 15 | 15 | 420 | Equal to. |
| 15 | 20 | 20 | 10 | 15 | 20 | 405 | Less than. |
| 20 | 20 | 20 | 5 | 20 | 15 | 415 | Greater than. |
| 20 | 20 | 20 | 5 | 15 | 20 | 410 | Do. |
| 25 | 20 | 20 | 5 | 15 | 15 | 425 | Do. |
| 25 | 15 | 20 | 5 | 15 | 20 | 420 | Less than. |
| 5 | 30 | 20 | 10 | 20 | 20 | 390 | Greater than. |
| 10 | 30 | 20 | 10 | 20 | 10 | 425 | Do. |
| | | 40 | 20 | 20 | 10 | 395 | Do. |
| 10 | 20 | 20 | 10 | 20 | 20 | 390 | Do. |
| | | 50 | 20 | 10 | 10 | 410 | Equal to. |

TABLE 5

| Weight percentage | | | | | | | Softening point °C. | Thermal coefficient of expansion compared to that of alumina |
|---|---|---|---|---|---|---|---|---|
| ZnO | $ZnF_2$ | $V_2O_5$ | $B_2O_3$ | $Bi_2O_3$ | $MoO_3$ | CuO | | |
| 19.0 | 19.0 | 19.0 | 9.5 | 19.0 | 10.0 | 4.75 | 420 | Equal to. |
| 18.2 | 18.2 | 18.2 | 9.1 | 18.2 | 9.1 | 9.1 | 410 | Do. |
| 18.2 | 22.7 | 13.6 | 9.1 | 18.2 | 9.1 | 9.1 | 410 | Do. |
| 19.0 | 23.8 | 14.3 | 9.5 | 19.0 | 10.0 | 4.75 | 420 | Do. |
| 22.7 | 22.7 | 9.1 | 9.1 | 18.2 | 9.1 | 9.1 | 425 | Do. |
| 23.8 | 23.8 | 10.0 | 10.0 | 19.0 | 9.5 | 5.0 | 435 | Do. |
| 18.2 | 22.7 | 9.1 | 9.1 | 22.7 | 9.1 | 9.1 | 420 | Greater than. |
| 19.0 | 23.8 | 10.0 | 10.0 | 19.0 | 14.3 | 10.0 | 425 | Do. |
| 18.2 | 22.7 | 9.1 | 9.1 | 18.2 | 9.1 | 9.1 | 430 | Equal to. |
| 20.0 | 25.0 | 15.0 | 10.0 | 10.0 | 10.0 | 10.0 | 410 | Do. |
| 15.0 | 20.0 | 15.0 | 10.0 | 20.0 | 10.0 | 10.0 | 400 | Do. | is expected, however, that the above additives will increase the softening point of the glass composition.

We claim:

1. A glass composition having a softening point equal to or below 485° C. and a linear thermal expansion matching that of alumina for sealing ceramic parts or encapsulating ceramic substrates, or both, the composition consisting essentially of materials of the quaternary system zinc oxide, vanadium pentoxide, boron trioxide, and phosphorus pentoxide, wherein the weight percentage of each of the materials is as follows:

zinc oxide from 10 to 60 percent;
vanadium pentoxide from 13 to 60 percent;
boron trioxide from 7.5 to 13 percent;
phosphorus pentoxide from 10 to 25 percent.

* * * * *